US012731994B2

(12) United States Patent
Li et al.

(10) Patent No.: US 12,731,994 B2
(45) Date of Patent: Sep. 8, 2026

(54) REACTIVE POWER SHARING METHOD FOR PARALLEL INVERTERS BASED ON VIRTUAL IMPEDANCE AND DYNAMIC DROOP COEFFICIENT

(71) Applicant: HUNAN UNIVERSITY OF TECHNOLOGY, Zhuzhou (CN)

(72) Inventors: Shengqing Li, Zhuzhou (CN); Xin Li, Zhuzhou (CN)

(73) Assignee: HUNAN UNIVERSITY OF TECHNOLOGY, Zhuzhou (CN)

( * ) Notice: Subject to any disclaimer, the term of this patent is extended or adjusted under 35 U.S.C. 154(b) by 444 days.

(21) Appl. No.: 18/470,394

(22) Filed: Sep. 19, 2023

(65) Prior Publication Data

US 2025/0096565 A1 Mar. 20, 2025

(51) Int. Cl.
*H02J 3/18* (2026.01)
*H02J 3/38* (2026.01)
*H02J 101/24* (2026.01)

(52) U.S. Cl.
CPC ................ *H02J 3/18* (2013.01); *H02J 3/381* (2013.01); *H02J 2101/24* (2026.01)

(58) Field of Classification Search
CPC ........... H02J 3/18; H02J 3/381; H02J 2101/24
USPC .......................................................... 307/82
See application file for complete search history.

*Primary Examiner* — Hal Kaplan

(57) ABSTRACT

The present invention discloses a reactive power sharing method for parallel inverters based on virtual impedance and a dynamic droop coefficient. The virtual impedance is constructed through the parameter design of voltage and current double-closed loop controllers and a line impedance observer, to realize power decoupling. A dynamic droop coefficient is constructed to adjust the output voltage of a virtual synchronous generator adaptively, and the output reactive power of inverters is controlled indirectly to achieve reactive power sharing according to capacities. The present invention does not need a communication network between the inverters, and only needs the local variable information of each inverter, so that a microgrid has the function of "plug and play".

5 Claims, 12 Drawing Sheets

REACTIVE POWER SHARING METHOD FOR PARALLEL INVERTERS BASED ON VIRTUAL IMPEDANCE AND DYNAMIC DROOP COEFFICIENT

TECHNICAL FIELD

The present invention relates to the technical field of parallel control of photovoltaic inverters in an isolated island mode, and more particularly to a reactive power sharing method for parallel inverters based on virtual impedance and a dynamic droop coefficient.

BACKGROUND

In the background of increasingly serious environmental pollution and resource shortage, solar energy as a kind of clean energy has the advantages of wide distribution and large reserves. Therefore, how to use the solar energy efficiently has become a research hotspot at home and abroad. As a core component in a solar power generation system, a photovoltaic inverter not only needs to increase the efficiency, but also needs to ensure that the Total Harmonic Distortion (THD) of the grid current satisfies the national grid connection standards. In off-grid microgrids, an interface of a distributed power supply is generally an inverter composed of power electronic devices, plays a role of converting direct current into alternating current output, and requires stable voltage and frequency to satisfy the standards of harmonic distortion rate and voltage imbalance. A plurality of distributed inverter power modules are generally connected in parallel at a Point of Common Coupling (PCC), and this parallel structure can improve the capacity and power density. In addition, the parallel connection of inverters can also enhance the redundancy and the reliability of the system. When the inverter fails, only a faulty module is removed, and the other inverters continue to power loads. However, the off-grid parallel inverters are not supported by the public grid, and the stability of voltage and frequency are relatively poor. The actual operation conditions of the microgrids are complex, and the parallel inverters are affected by many factors. Unreasonable application of the control mode of the inverters may cause the problems of inverter damage, reduction of operation efficiency and deterioration of power quality. Reasonable control of the parallel inverters is the key to maintain the reliable operation of the distributed microgrids.

At present, many scholars at home and abroad have done a lot of research on parallel control of the inverters. In "An improved virtual capacitor algorithm for reactive power sharing in multi-paralleled distributed generators" of "IEEE Transactions on Power Electronics", on issue 34 in 2022, a series of compensation links of voltage drop and dynamic voltage feedback links are added to achieve power sharing, but no optimal virtual impedance calculation method is given, and power distribution waveforms will be partially overcharged during load switching. "A virtual-impedance droop control for accurate active power control and reactive power sharing using capacitive-coupling inverters" in "IEEE Transactions on Industry Applications", on issue 56 in 2020 proposes a hierarchical control strategy for multi-parallel inverter microgrid tieline power. A physical tieline is used as a transmission medium of electrical signals. The error rate of signal transmission is small, but has no economic advantage compared with wireless communication. Centralized control has higher requirements for communication conditions. The "adaptive virtual impedance operation strategy for microgrid inverters with different capacities" in "Electric Power Automation Equipment", on issue 38 in 2018 proposes the adaptive virtual impedance strategy for microgrid inverters with different capacities. The value of virtual impedance is adjusted adaptively through active power feedback, so that the total line impedance ratio is changed in the direction close to the inverse ratio of inverter capacity. Under the condition of increasing the same value of virtual impedance, the adaptive virtual impedance strategy can obtain better power distribution effect than the conventional virtual impedance strategy. An "active power sharing resistive droop control strategy for microgrids based on virtual impedance" in "Electric Power Automation Equipment", on issue 40 in 2020 proposes an adaptive virtual resistance control method based on local information to reduce active power deviation. The active power and voltage outputted by a local inverter are used as feeding signals to adjust the value of the virtual resistance adaptively. The mechanism is revealed by the active power deviation equation, and the value of the virtual resistance coefficient is optimized in design by small signal stability analysis. A "precise power distribution control strategy for VSG parallel operation in isolated island microgrid in "Advanced Technology of Electrical Engineering and Energy" on issue 39 in 2020 proposes a voltage compensation strategy based on a distributed secondary controller. The reactive power value of each VSG is obtained through the distributed secondary controller; the stator reactance value of the VSG is adaptively adjusted according to the required reactive power; and the actual reactive power output value of the inverter is indirectly controlled to achieve the goal of accurate allocation of reactive power. This control strategy does not require line impedance information, still has strong robustness in the case of network communication failure, and can reduce the demand for communication network bandwidth in practical application. Meanwhile, a matching method of parameters of the VSG in parallel operation is also given.

The above methods use network communication to obtain the output power value of other inverters to achieve power sharing. In practical application, network communication failure may lead to power sharing failure, and the increase in the number of parallel inverters may increase the network communication burden, resulting in the problems of data packet loss or data delay. Thus, the output power of the parallel inverters cannot be shared according to the capacity of the inverters.

SUMMARY

In view of the problem that the difference of transmission impedance and load switching of each inverter leads to the uneven allocation of reactive power of parallel VSGs because the existing microgrid is operated in an isolated island mode and photovoltaic inverters are connected in parallel in VSG control mode, the present invention proposes a reactive power sharing method for parallel inverters based on virtual impedance and a dynamic droop coefficient, which analyzes the power allocation mechanism of parallel VSGs, constructs virtual impedance through a line impedance observer, and introduces VSG output reactive variables to construct a dynamic droop coefficient. Both of the virtual impedance and the dynamic droop coefficient adjust the output voltage of a virtual synchronous generator adaptively and control the reactive power outputted by the inverters to achieve reactive power sharing according to capacities.

In order to achieve the above purpose, the present invention adopts the following technical solution:

The reactive power sharing method for parallel inverters based on virtual impedance and the dynamic droop coefficient comprises the following steps:

S1. establishing Thevenin equivalent models of parallel VSGs for parallel inverters, analyzing the power allocation characteristics of the parallel VSGs to obtain a coupling relationship between active power and reactive power, and analyzing the reasons that the reactive power cannot be shared after decoupling to provide theoretical support for the proposed reactive power allocation method;

S2. collecting an a-phase feeder impedance current value $I_{ai}$, a b-phase feeder impedance current value $I_{bi}$, a c-phase feeder impedance current value $I_{ci}$, an a-phase filter capacitance voltage value $U_{cai}$, a b-phase filter capacitance voltage value $U_{cbi}$ and a c-phase filter capacitance voltage value $U_{cci}$ of an LC inverter, obtaining d-axis component feeder impedance current $i_{di}$, q-axis component feeder impedance current $i_{qi}$, d-axis component filter capacitance voltage $U_{cdi}$ and q-axis component filter capacitance voltage $U_{cqi}$ under dq0 coordinate system after Park transformation, constructing virtual impedance by a line impedance observer through the d-axis component feeder impedance current $i_{di}$, the q-axis component feeder impedance current $i_{qi}$, the d-axis component filter capacitance voltage $U_{cdi}$ and the q-axis component filter capacitance voltage $U_{cqi}$ and according to the coupling relationship between the active power and the reactive power, to achieve power decoupling, and calculating VSG active power $P_i$ and VSG reactive power $Q_i$, wherein i=1, 2;

S3. obtaining a voltage reference value $E_{abci}$ from the VSG reactive power $Q_i$, obtaining a d-axis voltage reference value $U^*_{cdi}$ and a q-axis voltage reference value $U^*_{cqi}$ under the dq0 coordinate system through Park transformation of the voltage reference value $E_{abci}$, and using the d-axis voltage reference value $U^*_{cdi}$ and the q-axis voltage reference value $U^*_{cqi}$ as voltage outer loop reference values of voltage and current double closed loops;

S4. constructing a dynamic droop coefficient by the VSG reactive power $Q_i$, and adjusting the d-axis voltage reference value $U^*_{cdi}$ and the q-axis voltage reference value $U^*_{cqi}$ adaptively by virtual impedance and the dynamic droop coefficient to obtain the adjusted d-axis VSG output voltage reference value $U_{refcdi}$ and q-axis VSG output voltage reference value $U_{refcqi}$;

S5. subtracting the d-axis VSG output voltage reference value $U_{refcdi}$, and the q-axis VSG output voltage reference value $U_{refcqi}$, as well as the d-axis component filter capacitance voltage $U_{cdi}$ and the q-axis component filter capacitance voltage $U_{cqi}$ in a voltage outer ring to obtain a capacitance voltage d-axis error value $\Delta U_{cdi}$ and a capacitance voltage q-axis error value $\Delta U_{cqi}$; obtaining a feeder impedance current d-axis reference value $i^*_{di}$ and a feeder impedance current q-axis reference value $i^*_{qi}$ value under the dq0 coordinate system from the capacitance voltage d-axis error value $\Delta U_{cdi}$ and the capacitance voltage q-axis error value $\Delta U_{cqi}$ by a PI controller; subtracting the feeder impedance current d-axis reference value $i^*_{di}$ and the feeder impedance current q-axis reference value $i^*_{qi}$, as well as the d-axis component feeder impedance current $i_{di}$ and the q-axis component feeder impedance current $i_{qi}$ to obtain a feeder impedance current d-axis error value $\Delta i_{di}$ and a feeder impedance current q-axis error value $\Delta i_{qi}$; obtaining d-axis modulation wave voltage $U_{md}$ and q-axis modulating wave voltage $U_{mq}$ from the feeder impedance current d-axis error value $\Delta i_{di}$ and the feeder impedance current q-axis error value $\Delta i_{qi}$ by the PI controller; and then conducting Park inverse transformation to obtain three-phase modulation wave voltage $U_{mabc}$.

Preferably, the feeder impedance current value is subjected to Park transformation to obtain:

$$i_{dq0i} = T_{abc\to dq0} i_{abci} = \begin{bmatrix} i_{di} \\ i_{qi} \\ i_0 \end{bmatrix}$$

wherein $i_{abci}[I_{ai}\ I_{bi}\ I_{ci}]^T$; $i_{di}$ is the d-axis component feeder impedance current after Park transformation; $i_{qi}$ is the q-axis component feeder impedance current after Park transformation; $i_0$ is the 0-axis component feeder impedance current with after Park transformation; $T_{abc\to dq0}$ is a Park transformation matrix; and $i_{dq0i}$ is the feeder impedance current under the dq0 coordinate system;

The filter capacitance voltage is subjected to Park transformation to obtain:

$$U_{cdq0i} = T_{abc\to dq0} U_{cabci} = \begin{bmatrix} U_{cdi} \\ U_{cqi} \\ U_{c0} \end{bmatrix}$$

wherein $U_{cabci}=[U_{cai}\ U_{cbi}\ U_{cci}]^T$; $U_{cdi}$ is the d-axis component filter capacitance voltage after Park transformation; $U_{cqi}$ is the q-axis component filter capacitance voltage after Park transformation; $U_{c0i}$ is the 0-axis component filter capacitance voltage after Park transformation; and $U_{cdq0i}$ is the filter capacitance voltage under the dq0 coordinate system;

The VSG active power $P_i$ and the VSG reactive power $Q_i$ after decoupling are:

$$\begin{cases} P_i = \dfrac{U_{cabci} U_L}{X_{oi}} \theta_i \\ Q_i = \dfrac{U_L (U_{cabci} - U_L)}{X_{oi}} \end{cases}$$

wherein $X_{oi}$ is the transmission reactance of inverter i; and $\theta_i$ is the phase angle of the transmission impedance, wherein i=1, 2 and $U_L$ is the load voltage.

Preferably, the specific implementation process of S3 is:

modeling by a second-order motion mathematical model of a synchronous generator, and calculating an actual angular frequency $\omega_i$ of a rotor:

$$\begin{cases} J\dfrac{d\Delta\omega}{dt} = \dfrac{P_m}{\omega_0} - \dfrac{P_e}{\omega_0} - D\Delta\omega \\ E_{abci} = U_{cabci} + i_{abci}(R_{oi} + jX_{oi}) \\ \Delta\omega = \omega_i - \omega_0 \end{cases}$$

wherein J is the moment of inertia of the synchronous generator; D is a damping coefficient; $P_m$ is a power provided by a virtual mechanical torque; $P_e$ is an output electromagnetic power; $\omega_i$ is the actual angular frequency of the rotor; $\omega_0$ is a rated angular frequency of the rotor; $E_{abci}=[E_{ai}\ E_{bi}\ E_{ci}]^T$ is a virtual three-phase electromotive force; $i_{abci}=[I_{ai}\ I_{bi}\ I_{ci}]^T$ is the filter inductance current; $U_{cabci}=[U_{cai}\ U_{cbi}\ U_{cci}]^T$ is the filter capacitance voltage; $R_{0i}$ is the transmission resistance of inverter i; $X_{0i}$ is the transmission reactance of inverter i; and i=1, 2;

In an isolated island mode, VSG adjusts the output of the VSG active power $P_i$ by controlling the virtual mechanical torque through active power-frequency droop, and adjusts the output of the VSG reactive power $Q_i$ by controlling a virtual potential through reactive power-voltage droop. The equation of droop control is:

$$\begin{cases} \omega_i = \omega_0 - K_{pi}P_i \\ U_i = U_0 - K_{qi}Q_i \end{cases}$$

wherein $\omega_0$ is the rated angular frequency of the rotor; $\omega_i$ is the actual angular frequency; $K_{pi}$ is an active power droop coefficient; $K_{qi}$ is a reactive power droop coefficient; $U_0$ is a rated voltage; and $U_i$ is an actual voltage;

Phase θ is generated from the VSG active power $P_i$, and the equation is:

$$\theta = \frac{K_{pi}(\omega_0 - \omega) - P_i}{J\omega_0 s^2 + Ds} + \frac{\omega_0}{s}$$

wherein θ is the phase calculated by a VSG algorithm; and s=a+jω is a complex frequency;

A voltage amplitude E is generated from the VSG reactive power $Q_i$, and the equation is:

$$E = U_0 - (K_{qi} + G_i K_i Q_i)Q_i$$

wherein $K_i$ is a reactive power adjustment coefficient, $G_i$ is a reactive power value signal and $U_0$ is a no-load potential;

The calculation formula of the voltage reference value $E_{abci}$ is:

$$E_{abci} = \begin{bmatrix} E_{ai} \\ E_{bi} \\ E_{ci} \end{bmatrix} = \begin{bmatrix} E\sin(\theta) \\ E\sin\left(\theta - \frac{2\pi}{3}\right) \\ E\sin\left(\theta + \frac{2\pi}{3}\right) \end{bmatrix}$$

wherein $E_{ai}$ represents the reference value of phase a voltage, $E_{bi}$ represents the reference value of phase b voltage, and $E_{ci}$ represents the reference value of phase c voltage.

Preferably, the specific implementation process of S4 comprises:

obtaining the d-axis virtual impedance voltage $U^*_{cdiv}$ and the q-axis virtual impedance voltage $U^*_{cqiv}$ under the dq0 coordinate system through Park transformation of the virtual impedance, and expressing a mathematical model under the dq0 coordinate system in a complex domain as:

$$\begin{bmatrix} U^*_{cdiv} \\ U^*_{cqiv} \end{bmatrix} = \frac{\omega_{fv}}{s + \omega_{fv}} \begin{bmatrix} -R_v & -sL_v & \omega L_v \\ -\omega L_v & -R_v & -sL_v \end{bmatrix} \begin{bmatrix} i_{od} \\ i_{oq} \end{bmatrix}$$

wherein $i_{od}$ and $i_{oq}$ are the d-axis and q-axis current components after Park transformation respectively; s is the complex frequency; $R_v$ and $L_v$ are the virtual resistance and the virtual inductance respectively; and $\omega_{fv}$ is the filter angular frequency;

constructing the dynamic droop coefficient through the VSG reactive power $Q_i$, with a specific equation as follows:

$$N = K_{qi} + G_i K_i Q_i$$

wherein N is the dynamic droop coefficient, $K_i$ is a reactive power adjustment coefficient, $G_i$ is a reactive power value signal, i=1, 2, and the value of $G_i$ is:

$$[G_1 G_2] = \begin{cases} [1, -1], & \frac{X_{vir1} + X_1}{U_L} < \frac{X_{vir2} + X_2}{U_L} \\ [0, 0], & \frac{X_{vir1} + X_1}{U_L} = \frac{X_{vir2} + X_2}{U_L} \\ [-1, 1], & \frac{X_{vir1} + X_1}{U_L} > \frac{X_{vir2} + X_2}{U_L} \end{cases}$$

wherein $X_{vir1}$ and $X_{vir2}$ are the virtual reactance of inverter 1 and inverter 2, respectively; $X_1$ and $X_2$ are the actual reactance of inverter 1 and inverter 2, respectively; and $U_L$ is the load voltage;

the voltage reference value after adding the dynamic droop coefficient is:

$$E_{1abci} = U_0 - NQ_i$$

$E_{1abci}$ is transformed by the dq0 coordinate into d-axis reference voltage $U^*_{cdiN}$ and q-axis reference voltage $U^*_{cqiN}$; and the d-axis voltage reference value $U^*_{cdi}$ and the q-axis voltage reference value $U^*_{cqi}$ are adjusted adaptively through the d-axis reference voltage $U^*_{cdiN}$, the q-axis reference voltage $U^*_{cqiN}$, the d-axis virtual impedance voltage $U^*_{cdiv}$ and the q-axis virtual impedance voltage $U^*_{cqiv}$ to obtain an adjusted d-axis VSG output voltage reference value $U_{refcdi}$ and an adjusted q-axis VSG output voltage reference value $U_{refeqi}$.

$$\begin{bmatrix} U^*_{cdiN} \\ U^*_{cqiN} \end{bmatrix} = T_{abc\to dq0}E_{abci} = T_{abc\to dq0}E_{1abci}\begin{bmatrix} U_{refcdi} \\ U_{refcqi} \end{bmatrix} = \begin{bmatrix} U^*_{cdiv} \\ U^*_{cqiv} \end{bmatrix} + \begin{bmatrix} U^*_{cdiN} \\ U^*_{cqiN} \end{bmatrix}.$$

Preferably, the d-axis modulation wave voltage $U_{md}$ and the q-axis modulation wave voltage $U_{mq}$ are:

$$\begin{cases} U_{md} = \left[(U_{refcdi} - U_{cdi})\left(K_{up} + \frac{K_{ui}}{s}\right) - \omega C U_{cqi} - i_{di}\right]\left(K_{ip} + \frac{K_{ii}}{s}\right) - \omega L i_{qi} \\ U_{mq} = \left[(U_{refcqi} - U_{cqi})\left(K_{up} + \frac{K_{ui}}{s}\right) - \omega C U_{cdi} - i_{qi}\right]\left(K_{ip} + \frac{K_{ii}}{s}\right) - \omega L i_{di} \end{cases}$$

wherein $K_{up}$ and $K_{ui}$ are the voltage loop ratio coefficient and the voltage loop integral coefficient of voltage PI regulation respectively; $K_{ip}$ and $K_{ii}$ are the current loop ratio coefficient and the current loop integral coefficient of voltage PI regulation respectively; CO is the actual angular frequency of the rotor; C is the filter capacitance value; and L is the filter inductance value.

In view of the problem that the difference of transmission impedance and load switching of parallel VSGs leads to the uneven allocation of reactive power in an isolated island microgrid, a reactive power sharing method for parallel inverters based on virtual impedance and a dynamic droop coefficient is proposed. An appropriate virtual impedance value is calculated by the impedance observer, and the dynamic droop coefficient is constructed by the reactive power variable to solve the problem of the poor precision of reactive power sharing during load switching. This control strategy does not need a communication network between the inverters, and only needs the local variable information of each inverter, so that the microgrid has the function of "plug and play".

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The technical solution is further explained below in combination with the specific technical background.

Figure 1:
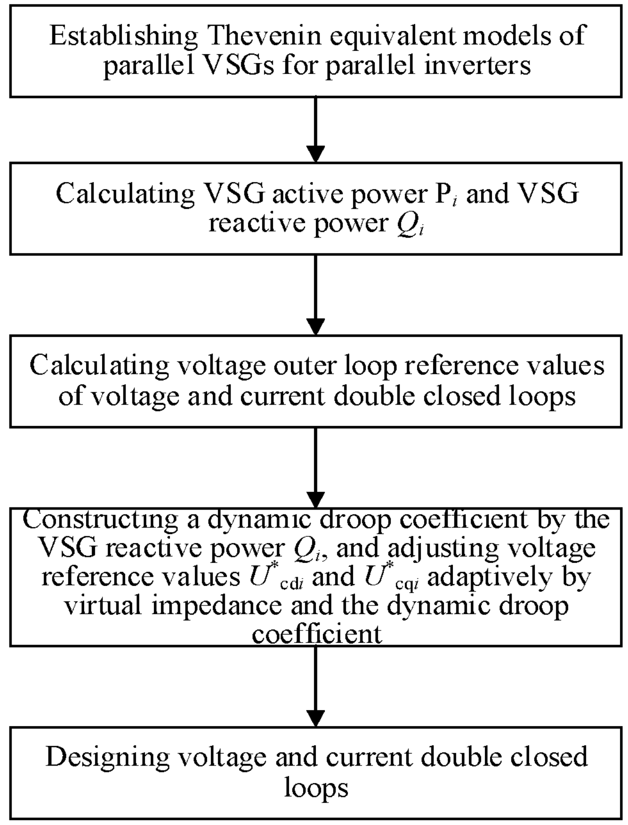
FIG. 1 is a flow chart of a reactive power sharing method for parallel inverters based on virtual impedance and a dynamic droop coefficient in the present invention.
Figure 2:
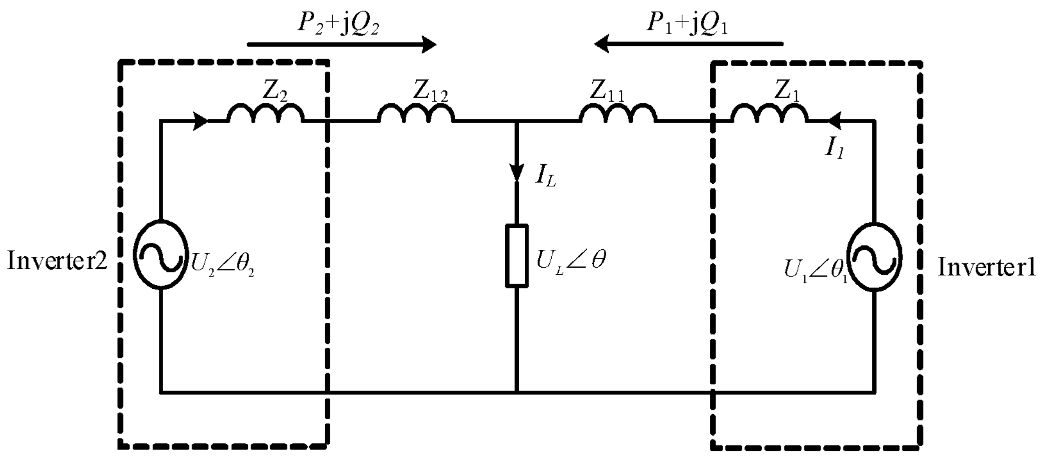
FIG. 2 shows Thevenin equivalent models of two parallel VSGs.

Embodiments of the present invention disclose a reactive power sharing method for parallel inverters based on virtual impedance and a dynamic droop coefficient, which, as shown in FIG. 1, comprises:

S1. establishing Thevenin equivalent models of parallel VSGs for parallel inverters, analyzing the power allocation characteristics of the parallel VSGs to obtain a coupling relationship between active power and reactive power, and analyzing the reasons that the reactive power cannot be shared after decoupling to provide theoretical support for the proposed reactive power allocation method;

The Thevenin equivalent models of parallel VSGs are established, and the power allocation characteristics of parallel VSGs are analyzed. FIG. 2 shows Thevenin equivalent models of two parallel VSGs.

One phase is selected for analysis. According to the equivalent models in FIG. 2, the output active power $P_{1i}$ of VSG and the output reactive power $Q_{1i}$ of VSG at PCC are obtained as follows:

$$\begin{cases} P_{1i} = \dfrac{\left[U_{cabci}U_L \cos\theta_i - U_L^2\right]R_{oi} + U_{cabci}U_L \sin\theta_i X_{oi}\right]}{R_{oi}^2 + X_{oi}^2} \\ Q_{1i} = \dfrac{\left[U_{cabci}U_L \cos\theta_i - U_L^2\right]X_{oi} - U_{cabci}U_L \sin\theta_i R_{oi}\right]}{R_{oi}^2 + X_{oi}^2} \end{cases} \quad (1)$$

Wherein the transmission reactance $Z_i+Z1_i=R_{oi}+X_{oi}$; $R_{oi}$ and $X_{oi}$ are the transmission resistance and reactance of inverter I respectively; and $\theta_i$ is the phase angle of the transmission impedance, wherein i=1, 2 and $U_L$ is the load voltage.

It can be seen from formula (1) that both reactive power and active power are related to the voltage amplitude, the phase angle and the transmission impedance, which indicates the existence of power coupling. The impedance ratios of transmission lines in low/high-voltage power distribution networks are different. In the low-voltage power distribution network, $X_i<<R_i$, and the line impedance is resistive. Virtual impedance is added to the VSG control algorithm to make the transmission impedance inductive, that is, $\theta_i=90°$. Then the active power is mainly related to the voltage phase angle, and the reactive power is mainly related to the voltage amplitude, thereby achieving the decoupling of the active power and the reactive power. The injected power after decoupling is rewritten as:

$$\begin{cases} P_i = \dfrac{U_{cabci}U_L}{X_{oi}}\theta_i \\ Q_i = \dfrac{U_L(U_{cabci} - U_L)}{X_{oi}} \end{cases} \quad (2)$$

Because the frequency is a global variable, the output voltage-reactive power equation of VSG in an isolated island mode can be obtained from formula (2) as follows:

$$Q_i = \frac{U_L(U_n - U_L)}{X_{oi} + U_L K_{qi}} \quad (3)$$

wherein Un is the rated output voltage.

It can be seen from formula (3) that the distribution of the reactive power of a single VSG in the isolated island mode is affected by the droop coefficient, AC bus voltage and the transmission reactance. The error of the reactive power of two VSGs is further analyzed. Assuming that the two VSGs have the same capacity, the error of the reactive power is:

$$\Delta Q = Q_1 - Q_2 = \frac{U_L(U_n - U_L)[(X_{o2} - X_{o1}) + U_L(K_{q2} - K_{q1})]}{(X_{o1} + U_L K_{q1})(X_{o2} + U_L K_{q2})} \quad (4)$$

wherein: $X_{01}$ and $X_{02}$ are VSG1 and VSG2 transmission impedances respectively; and $K_{q1}$ and $K_{q2}$ are VSG1 and VSG2 reactive power droop coefficients respectively.

It can be seen from formula (4) that since the transmission impedance $X_{oi}$ exists and the molecule ($U_n$–$U_L$) cannot be 0, the error of the reactive power can be reduced by reducing the transmission reactance difference ($X_{o2}$–$X_{o1}$) and the droop coefficient difference ($K_{q2}$–$K_{q1}$) between the two VSGs, or increasing the transmission impedance $X_{oi}$ and increasing the reactive power droop coefficient $K_{qi}$. If the transmission impedance and the reactive power droop coefficient are too large, the load voltage $U_L$ may fall beyond the allowable lower limit. The main reasons that affect the error of the reactive power are the transmission impedance difference ($X_{o2}$–$X_{o1}$) and the droop coefficient difference ($K_{q2}$–$K_{q1}$).

Figure 3:
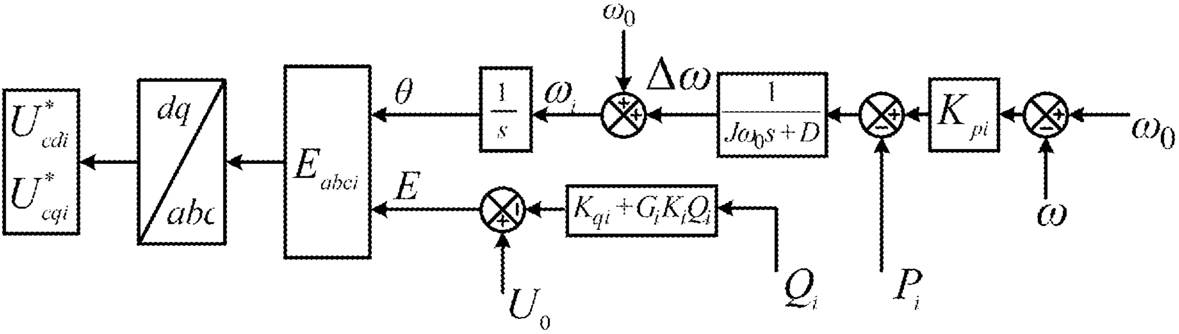
FIG. 3 is a block diagram of a VSG control algorithm.

S2. collecting an a-phase feeder impedance current value $I_{ai}$, a b-phase feeder impedance current value $I_{bi}$, a c-phase feeder impedance current value $I_{ci}$, an a-phase filter capacitance voltage value $U_{cai}$, a b-phase filter capacitance voltage value $U_{cbi}$ and a c-phase filter capacitance voltage value $U_{cci}$ of an LC inverter, obtaining d-axis component feeder impedance current $i_{di}$, q-axis component feeder impedance current $i_{qi}$, d-axis component filter capacitance voltage $U_{cdi}$ and q-axis component filter capacitance voltage $U_{cqi}$ under dq0 coordinate system after Park transformation, calculating VSG active power $P_i$ and VSG reactive power $Q_i$ through the d-axis component feeder impedance current $i_{di}$, the q-axis component feeder impedance current $i_{qi}$, the d-axis component filter capacitance voltage $U_{cdi}$ and the q-axis component filter capacitance voltage $U_{cqi}$, wherein i=1, 2;

S3. obtaining a voltage reference value $E_{abci}$ from the VSG output reactive power $Q_i$, obtaining a d-axis voltage reference value $U^*_{cdi}$ and a q-axis voltage reference value $U^*_{cqi}$ under the dq0 coordinate system through Park transformation of the voltage reference value $E_{abci}$, and using the d-axis voltage reference value $U^*_{cdi}$ and the q-axis voltage reference value $U^*_{cqi}$ as voltage outer loop reference values of voltage and current double closed loops, as shown in FIG. 3;

The second-order motion mathematical model of the synchronous generator is used to calculate the actual angular frequency $\omega_i$ of the rotor:

$$\begin{cases} J\dfrac{d\Delta\omega}{dt} = \dfrac{P_m}{\omega_0} - \dfrac{P_e}{\omega_0} - D\Delta\omega \\ E_{abci} = U_{cabci} + i_{abci}(R_{oi} + jX_{oi}) \\ \Delta\omega = \omega_i - \omega_0 \end{cases}$$

wherein J is the moment of inertia of the synchronous generator; D is a damping coefficient; $P_m$ is a power provided by a virtual mechanical torque; $P_e$ is an output electromagnetic power; $\omega_i$ is the actual angular frequency of the rotor; $\omega_0$ is a rated angular frequency of the rotor; $E_{abci}=[E_{ai}\ E_{bi}\ E_{ci}]^T$ is a virtual three-phase electromotive force; $i_{abci}=[I_{ai}\ I_{bi}\ I_{ci}]^T$ is the filter inductance current; $U_{cabi}=[U_{cai}\ U_{cbi}\ U_{cci}]^T$ is the filter capacitance voltage; $R_{0i}$ is the transmission resistance of inverter i; $X_{0i}$ is the transmission reactance of inverter i; and i=1, 2;

In an isolated island mode, VSG adjusts the output of the VSG active power $P_i$ by controlling the virtual mechanical torque through active power-frequency droop, and adjusts the output of the VSG reactive power $Q_i$ by controlling a virtual potential through reactive power-voltage droop. The equation of droop control is:

$$\begin{cases} \omega_i = \omega_0 - K_{pi}P_i \\ U_i = U_0 - K_{qi}Q_i \end{cases}$$

wherein $\omega_0$ is the rated angular frequency of the rotor; $\omega_i$ is the actual angular frequency; $K_{pi}$ is an active power droop coefficient; $K_{qi}$ is a reactive power droop coefficient; $U_0$ is a rated voltage; and $U_i$ is an actual voltage;

Phase θ is generated from the VSG active power $P_i$, and the equation is:

$$\theta = \frac{K_{pi}(\omega_0 - \omega) - P_i}{J\omega_0 s^2 + Ds} + \frac{\omega_0}{s}$$

wherein θ is the phase calculated by a VSG algorithm; and s=a+jω is a complex frequency;

A voltage amplitude E is generated from the VSG reactive power $Q_i$, and the equation is:

$$E = U_0 - (K_{qi} + G_i K_i Q_i)Q_i$$

wherein $K_i$ is a reactive power adjustment coefficient, $G_i$ is a reactive power value signal and $U_0$ is a no-load potential;

The calculation formula of the voltage reference value $E_{abci}$ is:

$$E_{abci} = \begin{bmatrix} E_{ai} \\ E_{bi} \\ E_{ci} \end{bmatrix} = \begin{bmatrix} E\sin(\theta) \\ E\sin\left(\theta - \frac{2\pi}{3}\right) \\ E\sin\left(\theta + \frac{2\pi}{3}\right) \end{bmatrix}$$

wherein $E_{ai}$ represents the reference value of phase a voltage, $E_{bi}$ represents the reference value of phase b voltage, and $E_{ci}$ represents the reference value of phase c voltage.

S4. constructing a dynamic droop coefficient by the VSG reactive power $Q_i$, and adjusting the d-axis voltage reference value $U^*_{cdi}$ and the q-axis voltage reference value $U^*_{cqi}$ adaptively by virtual impedance and the dynamic droop coefficient to obtain the adjusted d-axis VSG output voltage reference value $U_{refcdi}$ and q-axis VSG output voltage reference value $U_{refcqi}$;

In a power system, when the length of the transmission line is less than 100 km, the electric field effect of the transmission line is small, and the influence of admittance can be ignored. The transmission line is equivalent to be in-line. Taking a phase in the three phases for analysis, the complex power and the difference of the in-line equivalent circuit are calculate as follows:

$$\begin{cases} S_1 = U_1 I_2^* = U_1 I_2 \cos(\delta+\varphi) + jU_1 I_2 \sin(\delta+\varphi) \\ S_2 = U_2 I_2^* = U_2 I_2 \cos\varphi + jU_2 I_2 \sin\varphi \\ \Delta S = S_1 - S_2 = 3I_2^2 (R_{line} + j\omega L_{line}) \end{cases} \quad (5)$$

wherein: $S_1$ is the complex power at a first end, $S_2$ is the complex power at a final end, $U_2$ is the phase voltage at the final end, $U_1$ is the voltage at the first end, δ is the phase angle of $U_1$, $I_2$ is line current, $R_{line}$ and $L_{line}$ are line resistance and inductance, and (is an impedance angle.

Formula (5) is solved to obtain:

$$R_{line} = \frac{U_1 I_2 \cos(\delta+\varphi) - U_2 \cos\varphi}{3I_2} \quad (6)$$

$$L_{line} = \frac{U_1 \sin(\delta+\varphi) - U_2 \sin\varphi}{3\omega I_2} \quad (7)$$

wherein: ω is the angular velocity of the system;

The line impedance can be calculated in real time by formulas (6) and (7). After virtual reactance is introduced, the equivalent output impedance of parallel VSGs is approximately equal to the virtual impedance. The requirement of power decoupling can be satisfied by introducing the virtual negative resistance to offset the line resistance. The introduced virtual impedance is:

$$Z_v = R_v + jw(L_0 + K_L L_v) \quad (8)$$

wherein: $R_v = -R_{line}$ is virtual negative resistance; $K_L$ is an impedance adjustment coefficient; $L_0$ is initial virtual inductance; and $L_V$ is:

$$L_v = \begin{cases} L^* - L_{line}, & L^* > L_{line} \\ L_{line} - L^*, & L^* < L_{line} \end{cases} \quad (9)$$

wherein: L* is reference inductance, and the selection of the reference inductance is estimated according to the actual line length.

The added virtual impedance is multiplied with the line current $i_{oabc}$ to obtain the voltage drop $U^*_{civabc}$ generated by the virtual impedance. The mathematical model of the added virtual impedance under the abc coordinate system is as follows:

$$\begin{bmatrix} U^*_{civa} \\ U^*_{civb} \\ U^*_{civc} \end{bmatrix} = (L_0 + k_i L_v)\frac{d}{dt}\begin{bmatrix} i_{oa} \\ i_{ob} \\ i_{oc} \end{bmatrix} + R_v \begin{bmatrix} i_{oa} \\ i_{ob} \\ i_{oc} \end{bmatrix} \quad (10)$$

In formula (10), there may be harmonics in the line current $i_{oabc}$. Without treatment, the added virtual impedance will amplify harmonics, resulting in system instability. A low-pass filter is used for removing the harmonics in the line current and extracting the fundamental frequency component of the line current. The voltage and current double closed-loop control uses Park transformation to convert sinusoidal AC quantity into DC quantity and conduct decoupling. In order to correspond to the voltage and current double closed loops, the mathematical model in abc three-phase stationary coordinate system is transformed into a mathematical model in dq0 two-phase synchronous rotating coordinate system and expressed in the complex domain as follows:

$$\begin{bmatrix} U^*_{cidv} \\ U^*_{ciqv} \end{bmatrix} = \frac{\omega_{fv}}{s+\omega_{fv}} \begin{bmatrix} -R_v - sL_v & \omega L_v \\ -\omega L_v & -R_v - sL_v \end{bmatrix} \begin{bmatrix} i_{od} \\ i_{oq} \end{bmatrix} \quad (11)$$

Figure 4:
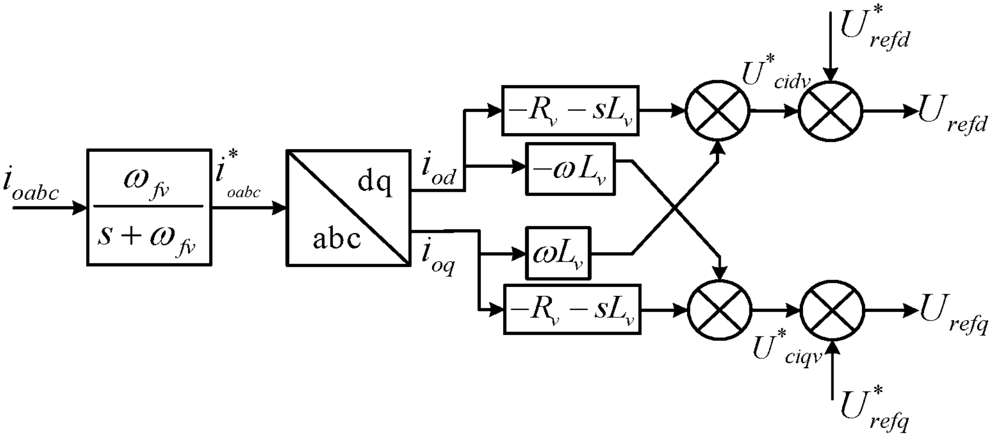
FIG. 4 is a control block diagram of virtual impedance under dq0 coordinate system.

The control block diagram with the virtual impedance is shown in FIG. 4:

After the virtual impedance is added, the transmission impedance is fully sensitive and the resistance effect is negligible. The virtual impedance achieves the purpose of increasing the line impedance by adjusting the output voltage of the virtual synchronous generator, and the generated virtual output voltage value is:

$$U_{civabc} = \frac{X_{viri}}{U_L} Q_i \quad (12)$$

wherein: $X_{viri}$ is the added virtual reactance; $X_{vir1} = w[L_0 + K_{L1}(L^* - L_{line1})]$, and $X_{vir2} = w[L_0 + K_{L2}(L_{line2} - L^*)]$.

The virtual output voltage value is substituted into the reactive power-voltage equation in formula (2), and the output voltage satisfies:

$$\begin{cases} U_{abci} = U_L + \frac{X_i}{U_L} Q_i + U_{civabc} \\ E_{abci} = U_0 - K_{qi} Q_i \end{cases} \quad (13)$$

Figure 6:
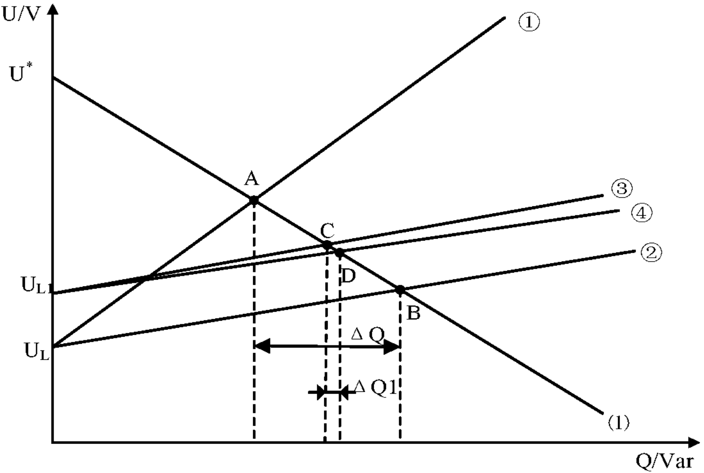
FIG. 6 is a schematic diagram of virtual impedance adjustment.

It can be seen from formula (13) that the addition of the virtual reactance actually changes the slope of the reactive power-voltage curve, and the specific adjustment principle of the virtual impedance is shown in FIG. 6.

In FIG. 6, two parallel VSGs are taken as an example. When the line impedance is different, ① and ② are the output voltage curves of VSG1 and VSG2 respectively. (1) is the reactive power-voltage droop curve; the reactive power droop curves of VSG1 and VSG2 are the same; U* is the reference value of the output voltage in no-load state; and $U_L$ is the voltage amplitude of the AC bus.

Before the virtual impedance is added, curve (1) intersects with ① at point A, corresponding to the reactive power emitted by VSG1. Curve (1) intersects with ② at point B, corresponding to the reactive power emitted by VSG2. Due to the difference in the line impedance, the difference in the reactive power emitted by VSG1 and VSG2 at this time is ΔQ. The difference in the reactive power is very large, and the reactive power sharing effect is poor. The virtual impedance is added according to formula (11). Since the line reactance $L_{line}$ of VSG1 is greater than the reference inductance L*, positive virtual reactance is added to VSG1, as shown in curve ③ in FIG. 6. The line reactance $L_{line}$ of VSG2 is less than the reference inductance L*. Negative virtual reactance is added to VSG2, as shown in curve ④ in FIG. 6. After adjustment, the difference in the reactive power is $\Delta Q_1$. Compared with ΔQ, the difference in the reactive power is greatly reduced, which indicates that the virtual impedance can effectively improve the sharing accuracy of the reactive power.

Figure 7:
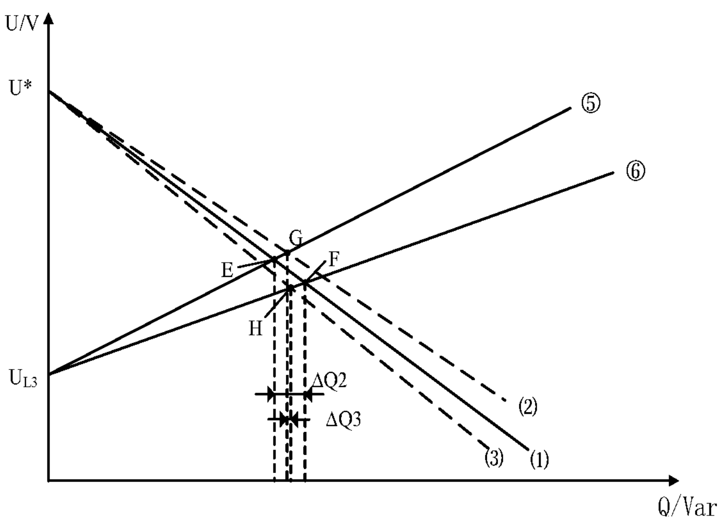
FIG. 7 is a schematic diagram of adjustment of a dynamic droop coefficient.

Although the virtual impedance can ensure the accuracy of reactive power sharing when the load is constant, when the load is increased, a reactive power point moves backward, and the line current $I_i$ is increased, causing the decrease in the load bus voltage $U_L$. According to formula (13), the slope angle difference between curves ③ and ④ can be obtained as follows:

$$\Delta\theta = \arctan\frac{[(X_1 + X_{vir1}) - (X_2 + X_{vir2})]}{U_L^2 + (X_1 + X_{vir1})(X_2 + X_{vir2})} \tag{14}$$

wherein the load bus voltage $U_L$ is decreased, and the slope difference $\Delta\theta$ of the output voltage curves between VSG1 and VSG2 is increased. At the same time, the reactive power point moves backward, which also causes the increase in the difference of the reactive power. As shown in FIG. 7, the output voltage curves of VSG1 and VSG2 are ⑤ and ⑥ respectively. The angle shows an increasing trend. The slope angle difference between the two is larger than the slope angle difference between ③ and ④ in FIG. 6. The output voltage-reactive power droop curves of VSG1 and VSG2 remain unchanged. Curve (1) intersects with ⑤ at point E and moves backward relative to point C in FIG. 6, corresponding to the reactive power emitted by VSG1. Curve (1) intersects with ⑥ at point F and moves backward relative to point D in FIG. 6, corresponding to the reactive power emitted by VSG2. At this time, the difference in the reactive power between VSG1 and VSG2 is $\Delta Q_2$. It can be seen that the switching of the load will lead to the increase of the difference in the reactive power and poor reactive power sharing effect.

It can be seen from the analysis of FIG. 7 that curve (1) intersects with ⑤ at point E, corresponding to the reactive power emitted by VSG1; and curve (1) intersects with ⑥ at point F, corresponding to the reactive power emitted by VSG2. The reason for the increase of the difference in reactive power caused by switching of the load is that the angle between the reactive power-voltage curves becomes larger, resulting in the decrease of the reactive power of VSG1 and the increase of the reactive power of VSG2. In order to improve the sharing accuracy of the reactive power after load change, reactive power $Q_i$ is introduced into the reactive power-voltage droop equation to construct a dynamic droop coefficient, and the dynamic droop coefficient is used for adjusting the slope of the reactive power-voltage droop curves of VSGs to reduce the difference in the reactive power between VSG1 and VSG2. The reconstructed VSG output voltage satisfies:

$$\begin{cases} U_{abci} = U_L + \dfrac{X_i}{U_L} Q_i + U_{civabc} \\ E_{1abci} = U_0 - NQ_i \end{cases} \tag{15}$$

wherein $N=K_{qi}+G_iK_iQ_i$ is the dynamic droop coefficient; $K_i$ is a reactive power adjustment coefficient; and $G_i$ is a reactive power value signal, and the value is:

$$[G_1 \;\; G_2] = \begin{cases} [1 \;\; -1], & \dfrac{X_{vir1} + X_1}{U_L} < \dfrac{X_{vir2} + X_2}{U_L} \\ [0 \;\; 0], & \dfrac{X_{vir1} + X_1}{U_L} = \dfrac{X_{vir2} + X_2}{U_L} \\ [-1 \;\; 1], & \dfrac{X_{vir1} + X_1}{U_L} > \dfrac{X_{vir2} + X_2}{U_L} \end{cases} \tag{16}$$

wherein: $[G_1\ G_2]=[0\ 0]$ represents that the slopes of the reactive power-voltage parallel curves of VSG1 and VSG2 are the same, and the reactive power is shared. $[G_1\ G_2]=[1\ -1]$ represents that the slope of the reactive power-voltage parallel curve of VSG1 is less than that of VSG2, and the output reactive power of VSG1 is less than that of VSG2. $[G_1\ G_2]=[-1\ 1]$ represents that the slope of the reactive power-voltage parallel curve of VSG1 is greater than that of VSG2, and the output reactive power of VSG1 is less than that of VSG2.

After the dynamic droop coefficient is added, the curve (2) intersects with ⑤ at point G, corresponding to the reactive power emitted by VSG1; and curve (3) intersects with ⑥ at point H, corresponding to the reactive power emitted by VSG2. At this time, the difference in the reactive power emitted by VSG1 and VSG2 is $\Delta Q_3$, and is greatly reduced. The sharing accuracy of the reactive power satisfies the requirements.

$E_{1abci}$ adjusted by the dynamic droop coefficient is transformed by the dq0 coordinate into d-axis reference voltage $U^*_{cdiN}$ and q-axis reference voltage $U^*_{cqiN}$; and the d-axis voltage reference value $U^*_{cdi}$ and the q-axis voltage reference value $U^*_{cqi}$ are adjusted adaptively through the d-axis reference voltage $U^*_{cdiN}$, the q-axis reference voltage $U^*_{cqiN}$, the d-axis virtual impedance voltage $U^*_{cdiv}$ and the q-axis virtual impedance voltage $U^*_{cqiv}$, to obtain an adjusted d-axis VSG output voltage reference value $U_{refcdi}$ and an adjusted q-axis VSG output voltage reference value $U_{refcqi}$:

$$\begin{bmatrix} U^*_{cdiN} \\ U^*_{cqiN} \end{bmatrix} = T_{abc\to dq0} E_{abci} = T_{abc\to dq0}(U_0 - NQ_i) \tag{17}$$

wherein $U^*_{cdiN}$ and $U^*_{cqiN}$ are the d-axis and q-axis components of the reference voltage after transformation by the dynamic droop coefficient and the dq0 coordinate of the voltage reference value $E_{abci}$.

$$\begin{bmatrix} U_{refcdi} \\ U_{refcqi} \end{bmatrix} = \begin{bmatrix} U^*_{cdiv} \\ U^*_{cqiv} \end{bmatrix} + \begin{bmatrix} U^*_{cdiN} \\ U^*_{cqiN} \end{bmatrix} \tag{18}$$

Figure 5:
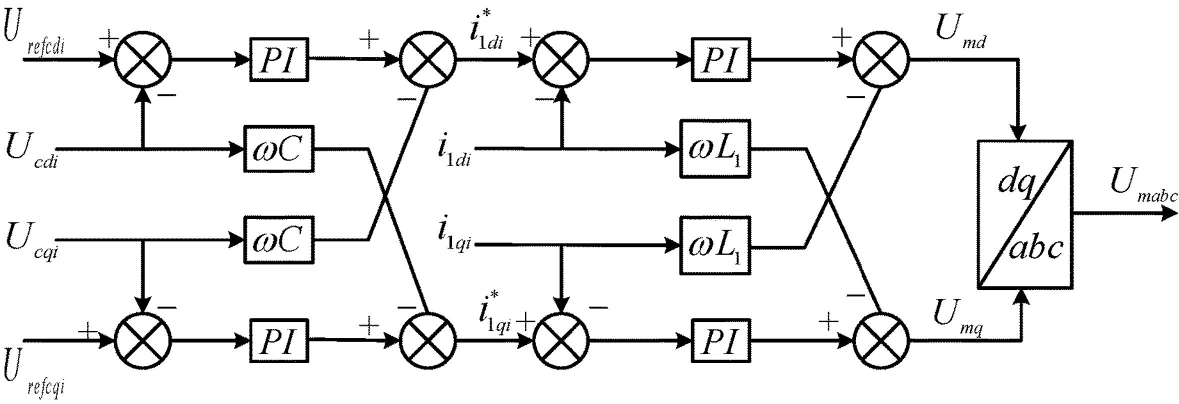
FIG. 5 is a control block diagram of voltage and current double closed loops.

S5. subtracting the d-axis VSG output voltage reference value $U_{refodi}$, and the q-axis VSG output voltage reference value $U_{refcqi}$, as well as the d-axis component filter capacitance voltage $U_{cdi}$ and the q-axis component filter capacitance voltage $U_{cqi}$, in a voltage outer ring to obtain a capacitance voltage d-axis error value $\Delta U_{cdi}$ and a capacitance voltage q-axis error value $\Delta U_{cqi}$; obtaining a feeder impedance current d-axis reference value $i^*_{di}$ and a feeder impedance current q-axis reference value $i^*_{qi}$ value under the dq0 coordinate system from the capacitance voltage d-axis error value $\Delta U_{cdi}$ and the capacitance voltage q-axis error value $\Delta U_{cqi}$ by a PI controller; subtracting the feeder impedance current d-axis reference value $i^*_{di}$ and the feeder impedance current q-axis reference value $i^*_{qi}$, as well as the d-axis component feeder impedance current $i_d$, and the q-axis component feeder impedance current $i_{qi}$ to obtain a feeder impedance current d-axis error value $\Delta i_{di}$ and a feeder impedance current q-axis error value $\Delta i_{qi}$; obtaining d-axis modulation wave voltage $U_{md}$ and q-axis modulating wave voltage $U_{mq}$ from the feeder impedance current d-axis error value $\Delta i_{di}$ and the feeder impedance current q-axis error value $\Delta i_{qi}$ by the PI controller; and then conducting Park inverse transformation to obtain three-phase modulation wave voltage $U_{mabc}$, as shown in FIG. 5.

The modulation wave voltages $U_{md}$ and $U_{mq}$ are:

$$\begin{cases} U_{md} = \dfrac{\left[(U_{refcdi} - U_{cdi})\left(K_{up} + \dfrac{K_{ui}}{s}\right) - \right.}{\left. \omega C U_{cqi} - i_{di}\right]\left(K_{ip} + \dfrac{K_{ii}}{s}\right) - \omega L i_{qi}} \\ U_{mq} = \left[(U_{refcqi} - U_{cqi})\left(K_{up} + \dfrac{K_{ui}}{s}\right) - \right. \\ \left. \omega C U_{cdi} - i_{qi}\right]\left(K_{ip} + \dfrac{K_{ii}}{s}\right) - \omega L i_{di} \end{cases} \tag{19}$$

wherein $U_{md}$ and $U_{mq}$ are the modulation voltages under the dq0 coordinate system; $K_{up}$ and $K_{ui}$ are the voltage loop ratio coefficient and the voltage loop integral coefficient of voltage PI regulation respectively; $K_{ip}$ and $K_{ii}$ are the current loop ratio coefficient and the current loop integral coefficient of voltage PI regulation respectively; and to is the actual angular frequency of the rotor.

Figure 8:
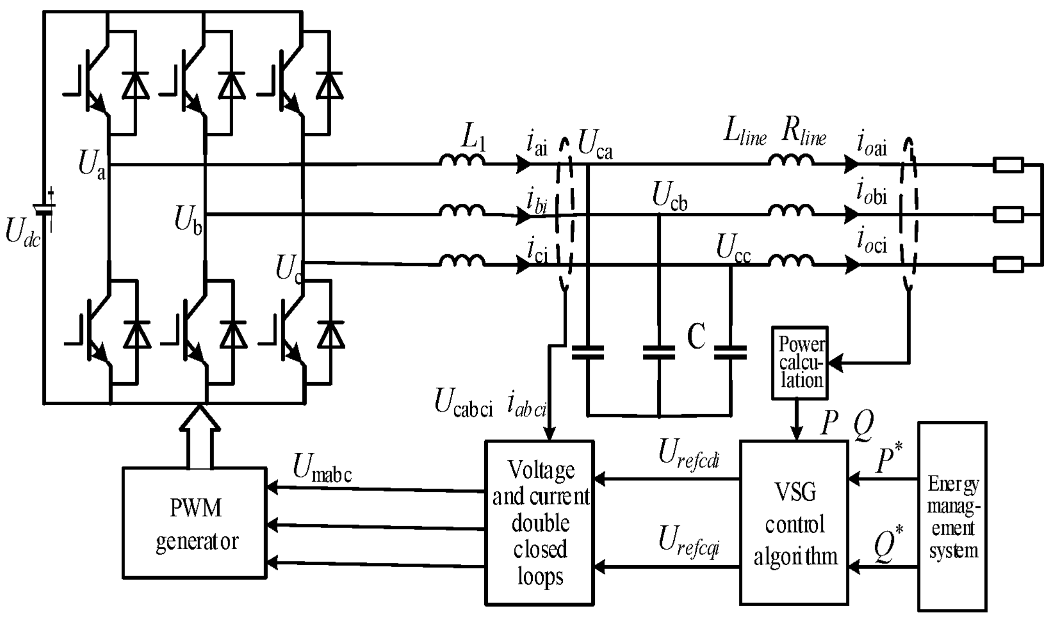
FIG. 8 is an overall control block diagram of a virtual synchronous generator.

An overall control block diagram of a virtual synchronous generator is shown in FIG. 8.

The correctness of the control method provided by the present invention is verified below in combination with simulation.

In order to verify the correctness of the proposed control method, a microgrid VSG parallel system based on two inverters is constructed on a Matlab/Simulink simulation platform, and both the inverters adopt the VSG control mode. Two loads are connected at a common bus. Load 1: active power P1=10 kw, and reactive power Q1=5 kvar; load 2: active power P2=5 kw, and reactive power Q2=3 kvar. The main parameters of the simulation process are shown in Table 1.

TABLE 1

Simulation Parameters

| Parameters | Values |
|---|---|
| Dc power supply $U_{dc}$/v | 800 |
| Filter inductance $L_1$/mH | 1.35 |
| Equivalent resistance of filter inductance R/Ω | 0.056 |
| Filter capacitance C/μF | 50 |
| Voltage loop ratio coefficient $K_{up}$ | 1 |
| Voltage loop integral coefficient $K_{ui}$ | 1000 |
| Current loop ratio coefficient $K_{ip}$ | 10.5 |
| Line impedance $Z_1$/Ω | 0.53 + j0.094 |
| Line impedance $Z_2$/Ω | 0.43 + j0.063 |
| Initial value of virtual inductance $L_V$/mH | 0.5 |
| Virtual resistance $R_{V1}$/Ω | 0.4 |
| Virtual resistance $R_{V2}$/Ω | 0.3 |
| Dynamic droop coefficient $K_{q1}$ | 0.65e−9 |
| Dynamic droop coefficient $K_{q1}$ | 0.68e−9 |

The simulation process mainly verifies the reactive power output deviation under three working conditions, the reactive power output deviation under the same capacity, the reactive power output deviation of load switching under the same capacity, and the reactive power output deviation of load switching under different capacities.

Figure 9A:
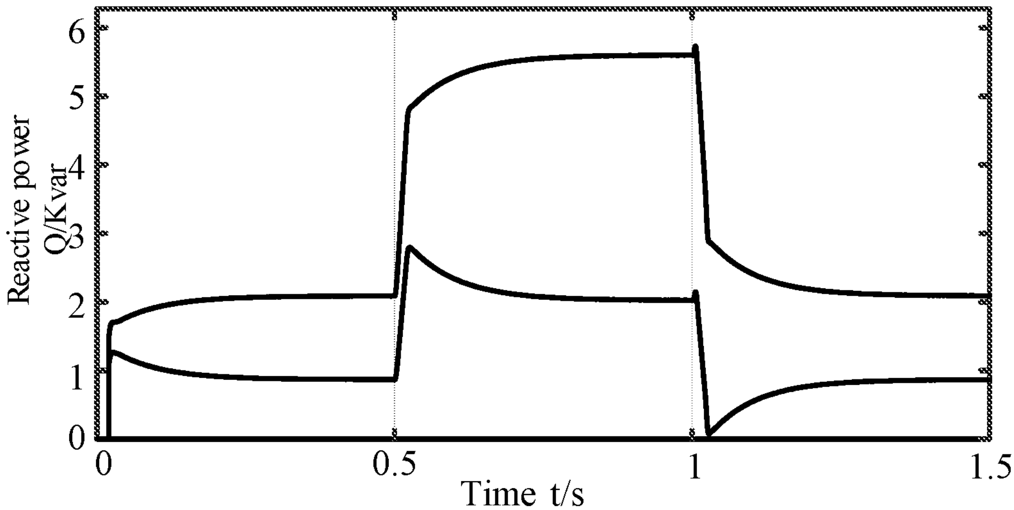
FIG. 9A is a control diagram of a traditional VSG.
Figure 9B:
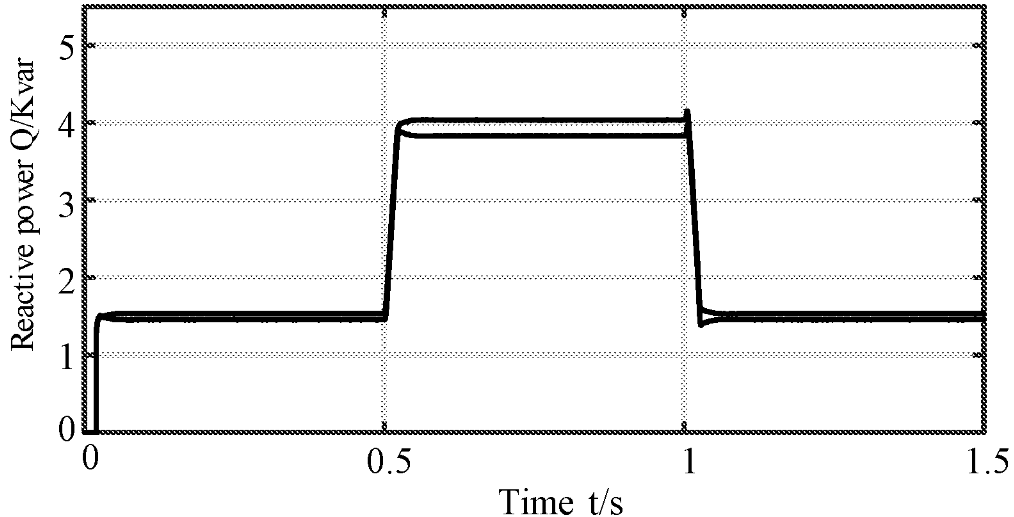
FIG. 9B is a VSG control diagram with virtual impedance added.
Figure 9C:
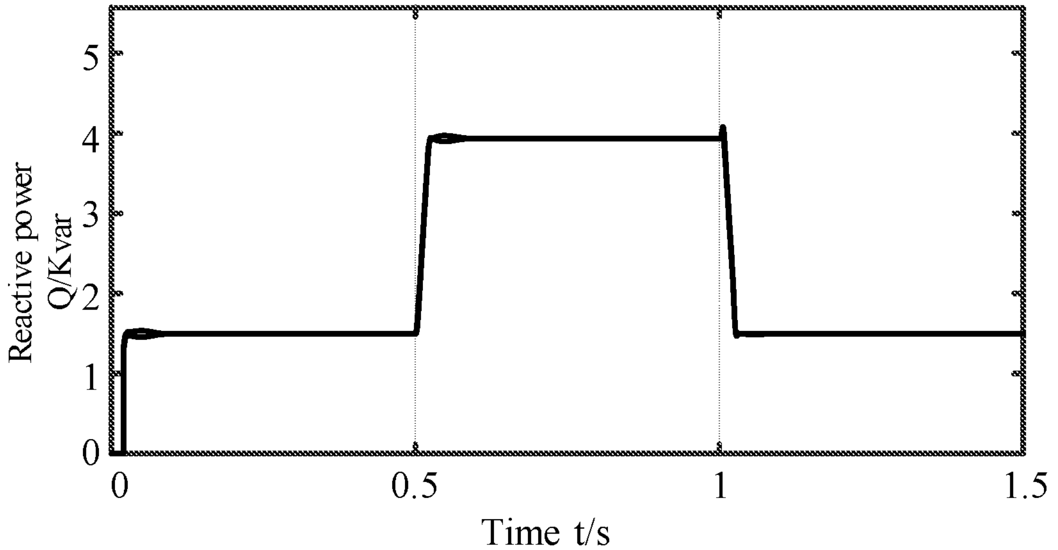
FIG. 9C is a VSG control diagram based on virtual impedance and a dynamic droop coefficient.

To verify the effectiveness of the reactive power sharing strategy under load switching, the load from 0 to 0.5 s is load 2, load 1 is inputted at 0.5 s, and load 1 is cut at 1 s. The VSG control with constant virtual impedance is compared with the control strategy for reactive power allocation herein. The reactive power output deviations before and after load switching are compared. The traditional VSG simulation waveform is shown in FIG. 9*a*, the VSG control with constant virtual impedance is shown in FIG. 9*b*, and the VSG control based on the virtual impedance and the dynamic droop coefficient is shown in FIG. 9*c*.

Figure 10:
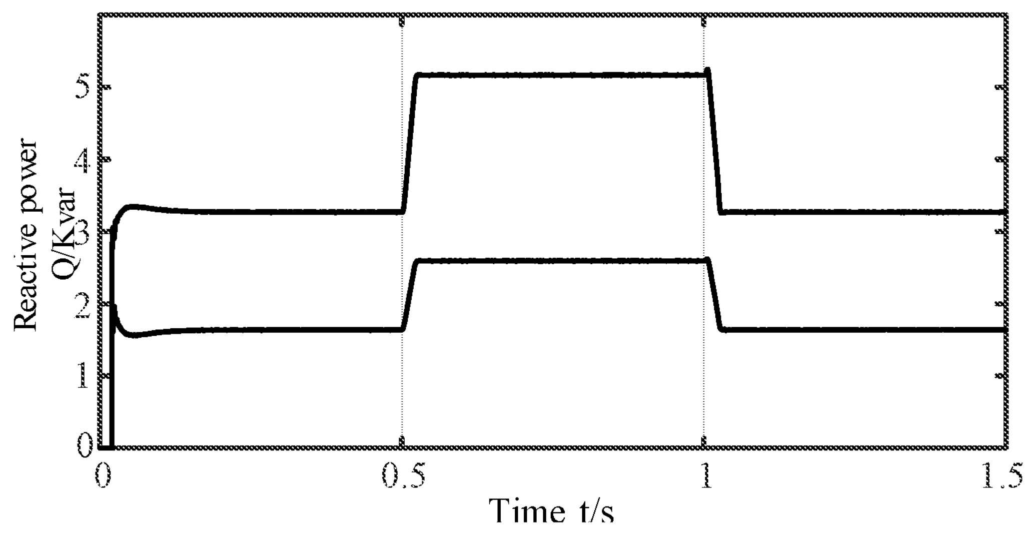
FIG. 10 shows power allocation waveforms of a VSG parallel system with different capacities.

To further verify the effectiveness of the reactive power sharing strategy in the load switching of VSG parallel systems with different capacities, the load from 0 to 0.5 s is load 2, load 1 is inputted at 0.5 s, and load 1 is cut at 1 s. The simulation waveform is shown in FIG. 10.

The simulation results show that, compared with VSG control with constant virtual impedance, the difference in the reactive power of the proposed control strategy is decreased from 317 var to 66 var, and the reactive power output deviation is decreased from 16.7% to 3.5%, which verifies the effectiveness and the feasibility of the proposed control strategy.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A reactive power sharing method for parallel inverters based on virtual impedance and a dynamic droop coefficient, comprising the following steps:

S1. establishing Thevenin equivalent models of parallel VSGs for parallel inverters, and analyzing the power allocation characteristics of the parallel VSGs to obtain a coupling relationship between active power and reactive power;

S2. collecting an a-phase feeder impedance current value $I_{ai}$, a b-phase feeder impedance current value $I_{bi}$, a c-phase feeder impedance current value $I_{ci}$, an a-phase filter capacitance voltage value $U_{cai}$, a b-phase filter capacitance voltage value $U_{cbi}$ and a c-phase filter capacitance voltage value $U_{cci}$ of an LC inverter, obtaining d-axis component feeder impedance current $i_{di}$, q-axis component feeder impedance current $i_{qi}$, d-axis component filter capacitance voltage $U_{cdi}$ and q-axis component filter capacitance voltage $U_{cqi}$ under dq0 coordinate system after Park transformation, constructing virtual impedance by a line impedance observer through the d-axis component feeder impedance current $i_{di}$, the q-axis component feeder impedance current $i_{qi}$, the d-axis component filter capacitance voltage $U_{cdi}$ and the q-axis component filter capacitance voltage $U_{cqi}$, and according to the coupling relationship between the active power and the reactive power, to achieve power decoupling, and calculating VSG active power $P_i$ and VSG reactive power $Q_i$, wherein i=1, 2;

S3. obtaining a voltage reference value $E_{abci}$ from the VSG reactive power $Q_i$, obtaining a d-axis voltage reference value $U^*_{cdi}$ and a q-axis voltage reference value $U^*_{cqi}$ under the dq0 coordinate system through Park transformation of the voltage reference value $E_{abci}$, and using the d-axis voltage reference value $U^*_{cdi}$ and the q-axis voltage reference value $U^*_{cqi}$ as voltage outer loop reference values of voltage and current double closed loops;

S4. constructing a dynamic droop coefficient by the VSG reactive power $Q_i$, and adjusting the d-axis voltage reference value $U^*_{cdi}$ and the q-axis voltage reference value $U^*_{cqi}$ adaptively by virtual impedance and the dynamic droop coefficient to obtain the adjusted d-axis VSG output voltage reference value $U_{refcdi}$ and q-axis VSG output voltage reference value $U_{refcqi}$;

S5. subtracting the d-axis VSG output voltage reference value $U_{refcdi}$, and the q-axis VSG output voltage reference value $U_{refcqi}$, as well as the d-axis component filter capacitance voltage $U_{cdi}$ and the q-axis component filter capacitance voltage $U_{cqi}$, in a voltage outer ring to obtain a capacitance voltage d-axis error value $\Delta U_{cdi}$ and a capacitance voltage q-axis error value $\Delta U_{cqi}$; obtaining a feeder impedance current d-axis reference value $i^*_{di}$ and a feeder impedance current q-axis reference value $i^*_{qi}$ value under the dq0 coordinate system from the capacitance voltage d-axis error value $\Delta U_{cdi}$ and the capacitance voltage q-axis error value $\Delta U_{cqi}$ by a PI controller; subtracting the feeder impedance current d-axis reference value $i^*_{di}$ and the feeder impedance current q-axis reference value $i^*_{qi}$, as well as the d-axis component feeder impedance current $i_d$, and the q-axis component feeder impedance current $i_{qi}$ to obtain a feeder impedance current d-axis error value $\Delta i_{di}$ and a feeder impedance current q-axis error value $\Delta i_{qi}$; obtaining d-axis modulation wave voltage $U_{md}$ and q-axis modulating wave voltage $U_{mq}$ from the feeder impedance current d-axis error value $\Delta i_{di}$ and the feeder impedance current q-axis error value $\Delta i_{qi}$ by the PI controller; and then conducting Park inverse transformation to obtain three-phase modulation wave voltage $U_{mabc}$.

2. The reactive power sharing method for parallel inverters based on virtual impedance and the dynamic droop coefficient according to claim 1, wherein the feeder impedance current value is subjected to Park transformation to obtain:

$$i_{dq0i} = T_{abc\to dq0} i_{abci} = \begin{bmatrix} i_{di} \\ i_{qi} \\ i_0 \end{bmatrix}$$

wherein $i_{abci}=[I_{ai}\ I_{bi}\ I_{ci}]^T$; $i_{di}$ is the d-axis component feeder impedance current after Park transformation; $i_{qi}$ is the q-axis component feeder impedance current after Park transformation; $i_0$ is the 0-axis component feeder impedance current with after Park transformation; $T_{abc\to dq0}$ is a Park transformation matrix; and $i_{dq0i}$ is the feeder impedance current under the dq0 coordinate system;

the filter capacitance voltage is subjected to Park transformation to obtain:

$$U_{cdq0i} = T_{abc\to dq0} U_{cabci} = \begin{bmatrix} U_{cdi} \\ U_{cqi} \\ U_{c0} \end{bmatrix}$$

wherein $U_{cabci}=[U_{cai}\ U_{cbi}\ U_{cci}]^T$; $U_{cdi}$ is the d-axis component filter capacitance voltage after Park transformation; $U_{cqi}$ is the q-axis component filter capacitance voltage after Park transformation; $U_{c0i}$ is the 0-axis component filter capacitance voltage after Park transformation; and $U_{cdq0i}$ is the filter capacitance voltage under the dq0 coordinate system;

the VSG active power $P_i$ and the VSG reactive power $Q_i$ after decoupling are:

$$\begin{cases} P_i = \dfrac{U_{cabci} U_L}{X_{oi}} \theta_i \\ Q_i = \dfrac{U_L (U_{cabci} - U_L)}{X_{oi}} \end{cases}$$

wherein $X_{oi}$ is the transmission reactance of inverter i; and $\theta_i$ is the phase angle of the transmission impedance, wherein i=1, 2 and $U_L$ is the load voltage.

3. The reactive power sharing method for parallel inverters based on virtual impedance and the dynamic droop coefficient according to claim 1, wherein a specific implementation process of S3 comprises:

modeling by a second-order motion mathematical model of a synchronous generator, and calculating an actual angular frequency $\omega_i$ of a rotor:

$$\begin{cases} J\dfrac{d\Delta\omega}{dt} = \dfrac{P_m}{\omega_0} - \dfrac{P_e}{\omega_0} - D\Delta\omega \\ E_{abci} = U_{cabci} + i_{abci}(R_{oi} + jX_{oi}) \\ \Delta\omega = \omega_i - \omega_0 \end{cases}$$

wherein J is the moment of inertia of the synchronous generator; D is a damping coefficient; $P_m$ is a power provided by a virtual mechanical torque; $P_e$ is an output electromagnetic power; $\omega_i$ is the actual angular frequency of the rotor; $\omega_0$ is a rated angular frequency of the rotor; $E_{abci}=[E_{ai}\ E_{bi}\ E_{ci}]^T$ is a virtual three-phase electromotive force; $i_{abci}=[I_{ai}\ I_{bi}\ I_{ci}]^T$ is the filter inductance current; $U_{cabci}=[U_{cai}\ U_{cbi}\ U_{cci}]^T$ is the filter capacitance voltage; $R_{0i}$ is the transmission resistance of inverter i; $X_{0i}$ is the transmission reactance of inverter i; and i=1, 2;

in an isolated island mode, the VSGs adjust the output of the VSG active power $P_i$ by controlling the virtual mechanical torque through active power-frequency droop, and adjust the output of the VSG reactive power $Q_i$ by controlling a virtual potential through reactive power-voltage droop; the equation of droop control is:

$$\begin{cases} \omega_i = \omega_0 - K_{pi} P_i \\ U_i = U_0 - K_{qi} Q_i \end{cases}$$

wherein $\omega_0$ is the rated angular frequency of the rotor; $\omega_i$ is the actual angular frequency; $K_{pi}$ is an active power droop coefficient; $K_{qi}$ is a reactive power droop coefficient; $U_0$ is a rated voltage; and $U_i$ is an actual voltage;

phase θ is generated from the VSG active power $P_i$, and the equation is:

$$\theta = \frac{K_{pi}(\omega_0 - \omega) - P_i}{J\omega_0 s^2 + Ds} + \frac{\omega_0}{s}$$

wherein θ is the phase calculated by a VSG algorithm; and s=a+jω is a complex frequency;

a voltage amplitude E is generated from the VSG reactive power $Q_i$, and the equation is:

$$E = U_0 - (K_{qi} + G_i K_i Q_i) Q_i$$

wherein $K_i$ is a reactive power adjustment coefficient, $G_i$ is a reactive power value signal and $U_0$ is a no-load potential;

the calculation formula of the voltage reference value $E_{abci}$ is:

$$E_{abci} = \begin{bmatrix} E_{ai} \\ E_{bi} \\ E_{ci} \end{bmatrix} = \begin{bmatrix} E\sin(\theta) \\ E\sin\left(\theta - \frac{2\pi}{3}\right) \\ E\sin\left(\theta + \frac{2\pi}{3}\right) \end{bmatrix}$$

wherein $E_{ai}$ represents the reference value of phase a voltage, $E_{bi}$ represents the reference value of phase b voltage, and $E_{ci}$ represents the reference value of phase c voltage.

4. The reactive power sharing method for parallel inverters based on virtual impedance and the dynamic droop coefficient according to claim 3, wherein the specific implementation process of S4 comprises:

obtaining the d-axis virtual impedance voltage $U^*_{cdiv}$ and the q-axis virtual impedance voltage $U^*_{cqiv}$ under the dq0 coordinate system through Park transformation of the virtual impedance, and expressing a mathematical model under the dq0 coordinate system in a complex domain as:

$$\begin{bmatrix} U^*_{cdiv} \\ U^*_{cqiv} \end{bmatrix} = \frac{\omega_{fv}}{s + \omega_{fv}} \begin{bmatrix} -R_v & -sL_v & \omega L_v \\ -\omega L_v & -R_v & -sL_v \end{bmatrix} \begin{bmatrix} i_{od} \\ i_{oq} \end{bmatrix}$$

wherein $i_{od}$ and $i_{oq}$ are the d-axis and q-axis current components after Park transformation respectively; s is the complex frequency; $R_v$ and $L_v$ are the virtual resistance and the virtual inductance respectively; and $\omega_{fv}$ is the filter angular frequency;

constructing the dynamic droop coefficient through the VSG reactive power $Q_i$, with a specific equation as follows:

$$N = K_{qi} + G_i K_i Q_i$$

wherein Nis the dynamic droop coefficient, $K_i$ is a reactive power adjustment coefficient, $G_i$ is a reactive power value signal, and i=1, 2;

the voltage reference value $E_{1abci}$ after adding the dynamic droop coefficient is:

$$E_{1abci} = U_0 - NQ_i$$

the voltage reference value $E_{1abci}$ is transformed by the dq0 coordinate into d-axis reference voltage $U^*_{cdiN}$ and q-axis reference voltage $U^*_{cqiN}$; and the d-axis voltage reference value $U^*_{cdi}$ and the q-axis voltage reference value $U^*_{cqi}$ are adjusted adaptively through the d-axis reference voltage $U^*_{cdiN}$, the q-axis reference voltage $U^*_{cqiN}$, the d-axis virtual impedance voltage $U^*_{cdiv}$ and the q-axis virtual impedance voltage $U^*_{cqiv}$, to obtain an adjusted d-axis VSG output voltage reference value $U_{refcdi}$ and an adjusted q-axis VSG output voltage reference value $U_{refcqi}$:

$$\begin{bmatrix} U^*_{cdiN} \\ U^*_{cqiN} \end{bmatrix} = T_{abc\to dq0} E_{abci} = T_{abc\to dq0} E_{1abci}$$

$$\begin{bmatrix} U_{refcdi} \\ U_{refcqi} \end{bmatrix} = \begin{bmatrix} U^*_{cdiv} \\ U^*_{cqiv} \end{bmatrix} + \begin{bmatrix} U^*_{cdiN} \\ U^*_{cqiN} \end{bmatrix}.$$

5. The reactive power sharing method for parallel inverters based on virtual impedance and the dynamic droop coefficient according to claim 4, wherein the d-axis modulation wave voltage $U_{md}$ and the q-axis modulation wave voltage $U_{mq}$ are:

$$\begin{cases} U_{md} = \left[(U_{refcdi} - U_{cdi})\left(K_{up} + \frac{K_{ui}}{s}\right) - \omega C U_{cqi} - i_{di}\right]\left(K_{ip} + \frac{K_{ii}}{s}\right) - \omega L i_{qi} \\ U_{mq} = \left[(U_{refcqi} - U_{cqi})\left(K_{up} + \frac{K_{ui}}{s}\right) - \omega C U_{cdi} - i_{qi}\right]\left(K_{ip} + \frac{K_{ii}}{s}\right) - \omega L i_{di} \end{cases}$$

wherein $K_{up}$ and $K_{ui}$ are a voltage loop ratio coefficient and a voltage loop integral coefficient of voltage PI regulation respectively; $K_{ip}$ and $K_{ii}$ are a current loop ratio coefficient and a current loop integral coefficient of voltage PI regulation respectively; co is the actual angular frequency of the rotor; C is the filter capacitance value; and L is the filter inductance value.

* * * * *